(12) United States Patent
Shoji et al.

(10) Patent No.: US 7,576,336 B2
(45) Date of Patent: Aug. 18, 2009

(54) RADIATION IMAGE DETECTOR

(75) Inventors: Takehiko Shoji, Tokyo (JP); Yasushi Nakano, Tokyo (JP)

(73) Assignee: Konica Minolta Medical & Graphic, Inc. (JP)

( * ) Notice: Subject to any disclaimer, the term of this patent is extended or adjusted under 35 U.S.C. 154(b) by 0 days.

(21) Appl. No.: 12/039,859

(22) Filed: Feb. 29, 2008

(65) Prior Publication Data

US 2008/0217550 A1 Sep. 11, 2008

(30) Foreign Application Priority Data

Mar. 5, 2007 (JP) .............................. 2007-053919

(51) Int. Cl.
*G01J 1/58* (2006.01)

(52) U.S. Cl. .................................................. 250/483.1

(58) Field of Classification Search .............. 250/484.1, 250/483.1, 370.01–370.15
See application file for complete search history.

(56) References Cited

U.S. PATENT DOCUMENTS

| | | | | |
|---|---|---|---|---|
| 3,594,576 A | * | 7/1971 | Muller-rech et al. | ........ 378/184 |
| 4,032,790 A | * | 6/1977 | Nakamura | ................... 378/187 |
| 4,963,751 A | * | 10/1990 | Kano et al. | ............... 250/484.4 |
| 2003/0160185 A1 | * | 8/2003 | Homme | .................... 250/483.1 |

FOREIGN PATENT DOCUMENTS

| JP | 2000-9845 A | 1/2000 |
|---|---|---|
| JP | 2002-116258 A | 4/2002 |
| JP | 2006-189377 A | 7/2006 |

* cited by examiner

*Primary Examiner*—David P. Porta
*Assistant Examiner*—Kiho Kim
(74) *Attorney, Agent, or Firm*—Cantor Colburn LLP

(57) ABSTRACT

A radiation image detector comprising: a scintillator panel comprising a radiation transmitting substrate having thereon a phosphor layer having a columnar crystal structure produced with a vapor deposition method; a protection cover provided at a side of the radiation transmitting substrate opposite the phosphor layer, provided that incident radiation enters through the protection cover; and a flat light-receiving element provided at a side of the radiation transmitting substrate opposite the protection cover, the flat light-receiving element comprising a plurality of light-receiving pixels arranged in a two-dimensional form and capable of converting light emitted from the scintillator panel to electricity, wherein the radiation image detector satisfies the following Formula (1): $W(g) < 0.31(g/cm^2) \times S(cm^2)$

4 Claims, 2 Drawing Sheets

RADIATION IMAGE DETECTOR

This application is based on Japanese Patent Application No. 2007-053919 filed on Mar. 5, 2007 with Japan Patent Office, the entire content of which is hereby incorporated by reference.

TECHNICAL FIELD

The present invention relates to a radiation image detector.

BACKGROUND

Heretofore, radiation images such as X-ray images have been widely applied to diagnosis of the state of a disease in medical settings. In recent years, digital system radiation image detectors, represented by a flat panel type radiation detector (FPD) have appeared, whereby it is now possible to process radiation images without limitation upon obtaining as digital information and to instantaneously transmit such image information.

With regard to the FPD, a scintillator panel is employed, which emits fluorescence instantaneously when received radiation which is transmitted through a subject at an intensity in accordance with the amount of the radiation. The light emission efficiency of the scintillator panel increases with the thickness of the phosphor layer. However, when the phosphor layer is excessively thick, the contrast of images is lowered due to the scattered light generated within the phosphor layer. High contrast images are essential for effective diagnosis.

When columnar crystal structured phosphors such as cesium iodide (CsI) are employed, generation of scattered light within the crystal is decreased due to a light-guiding effect, whereby it is possible to enhance light emission efficiency in such a state that the contrast is retained by increasing the thickness of the phosphor layer. Further, it is also possible to enhance light emission efficiency by incorporating elements such as thallium (Tl) as an activator into cesium iodide (CsI). (refer, for example, to Patent Document 1)

Usually a protection cover is provided on the radiation incident side of a scintillator panel to protect the scintillator panel against external impact. In addition, a light-receiving element which receives light emitted from the scintillator panel is provided on the opposite side of the protection cover of the scintillator panel. Further, a cushioning member is arranged between the scintillator panel and the protection cover so that the cushioning member brings the scintillator panel into appropriate contact with the flat light-receiving element so that the scintillator panel is brought into pressure contact with the light-receiving element at an appropriate pressure by pressure from the compressed cushion element when a protection cover is furnished.

When a radiation image detector is assembled, a scintillator panel and a cushioning element are sequentially placed on the light-receiving element arranged within the cabinet, followed by fixing the protection cover to the cabinet with such as screws.

In such a case, when pressure applied to the cushioning member is excessively high, the tips of phosphor crystals of columnar crystal structure are modified to result in a decrease in the contrast of radiation images. On the contrary, when the pressure of the cushioning member is too low, the scintillator panel is not sufficiently brought into contact with the flat light-receiving element while the FPD is directed downward, whereby the contrast of radiation images is adversely lowered. Further, due to friction between the scintillator panel and the flat light-receiving element via shifting or vibration of the FPD, defects apparently tend to occur in the flat light-receiving element or within the phosphor layer.

In general, a phosphor layer thickness of at least 400 μm is necessary to prepare radiation images with targeted graininess. However, the increase in weight or size of the scintillator panel due to the increase in layer thickness results in problems more serious than those described above.

To solve these problems, various methods have been proposed which include a method to fix the scintillator panel and the flat light-receiving element with adhesives (for example, refer to Patent Document 2), and a method to allow the scintillator panel to adhere to the flat light-receiving element by employing matching oil (refer, for example, to Patent Document 3). These methods, however, have problems such as generation of unevenness of the adhesives or the matching oil, and an increase in operation man-hours.

(Patent Document 1) Japanese Patent Publication Open to Public Inspection (hereinafter referred to as JP-A) No. 2002-116258

(Patent Document 2) JP-A No. 2006-189377

(Patent Document 3) JP-A No. 2000-9845

SUMMARY

In view of the foregoing, the present invention was achieved. An object of the present invention is to provide a radiation image detector which is readily assembled and results in desired graininess and contrast.

The above object of the present invention can be achieved by the following embodiments.

(1) One of the aspects of the present invention is a radiation image detector comprising:

a scintillator panel comprising a radiation transmitting substrate having thereon a phosphor layer having a columnar crystal structure produced with a vapor deposition method;

a protection cover provided at a side of the radiation transmitting substrate opposite the phosphor layer, provided that incident radiation enters through the protection cover; and a flat light-receiving element provided at a side of the radiation transmitting substrate opposite the protection cover, the flat light-receiving element comprising a plurality of light-receiving pixels arranged in a two-dimensional form and capable of converting light emitted from the scintillator panel to electricity, wherein the radiation image detector satisfies the following Formula (1):

$$W(g) < 0.31(g/cm^2) \times S(cm^2) \qquad \text{Formula (1)}$$

wherein $S(cm^2)$ is an area of the radiation transmitting substrate of the scintillator panel and $W(g)$ is a weight of the scintillator panel.

(2) Another aspect of the present invention is a radiation image detector of the above-described item 1, wherein the phosphor layer has a thickness of 400 to 1,000 μm, and the area of the radiation transmitting substrate is 500 to 5,000 $cm^2$.

(3) Another aspect of the present invention is a radiation image detector of the above-described items 1 or 2, wherein a foaming material is provided in a space between the protection cover and the scintillator panel so as to bring the scintillator panel into pressure contact with the flat light-receiving element at a pressure of 0.1 to 20 kPa.

(4) Another aspect of the present invention is a radiation image detector of the above-described item 3, wherein the foaming material is a silicon foaming material or a urethane foaming material.

(5) Another aspect of the present invention is a radiation image detector of any one of the above-described items 1-4,
wherein the protection cover comprises aluminum or carbon.

According to the present invention, pressure generated by the scintillator panel's weight and the cushioning member is optimized to result in high sharpness irrespective of the direction of radiation incident to the plane of the FPD. Further, since neither adhesives nor oil is needed for allowing the scintillator panel to adhere to the flat light-receiving element, during assembly of the radiation image detector, the radiation image detector is readily assembled with high precision by providing a protection cover after placing only the scintillator panel and the cushioning member onto the light-receiving element.

DESCRIPTION OF THE PREFERRED EMBODIMENTS

The present embodiments will now be described with reference to the drawings. However the present invention is not limited thereto.

It was found that the scintillator panel having the following specific feature exhibits excellent effects of the present invention: a weight of the scintillator panel per a unit area (1 cm2) is less than 0.31 g. It is believed that the scintillator panel can be kept fixed in the radiation image detector when the weight of the scintillator panel is less than 0.31 g/cm$^2$. It was also found that a preferred minimum weight of the scintillator panel should be 0.10 g/cm$^2$ so as to obtain a required excellent sharp image.

Figure 1:
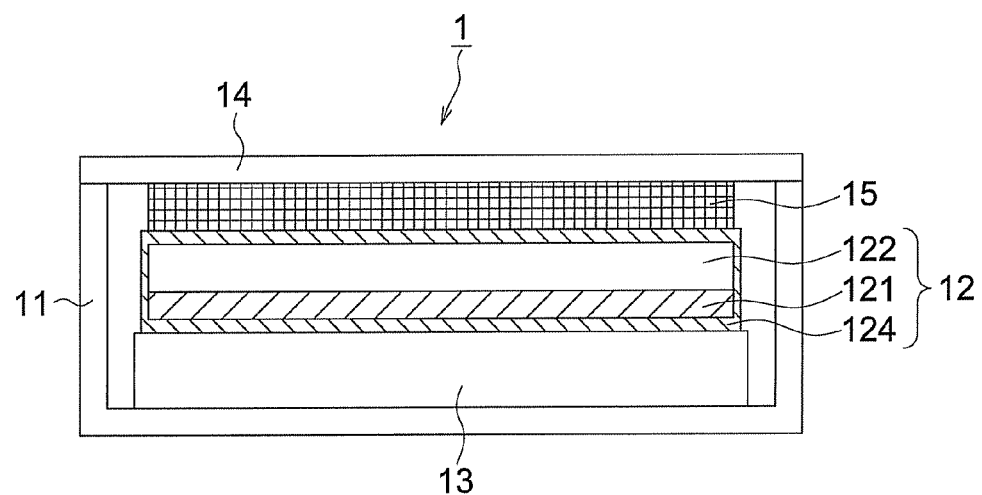
FIG. 1 is a configuration view of a radiation image detector.

FIG. 1 is a configuration view of radiation image detector 1 according to the present embodiment. Radiation image detector 1 is provided in cabinet 11, enclosing scintillator panel 12 which instantaneously emits fluorescence when received radiation which is transmitted through a subject at an intensity in accordance with the amount of the radiation, flat light-receiving element 13 which is arranged to allow pressure contact with scintillator panel 12 and on which a plurality of light-receiving pixels conducting photoelectric conversion of light from scintillator panel 12 are arranged two-dimensionally, and protection cover 14 which protects scintillator panel 12.

Scintillation panel 12 is constituted so that scintillation panel 12 together with substrate 122, on which phosphor layer 121 is formed, are enclosed by protection film 124. Cushioning layer 15 as a cushioning member is arranged on the opposite side of the phosphor layer of the scintillator panel, and the above scintillator panel is brought into pressure contact with the flat light-receiving element.

Substrate 122 is composed of materials which allow transmission of radiation. It is preferable that substrate 122 is provided with a reflective metal layer incorporating at least one metal selected from the group consisting of Al, Ag, Cr, Cu, Ni, Mg, Pt, and Au, and of a sublayer to enhance adhesion between the substrate and the phosphor layer. Further, it is preferable that substrate 122 is a flexible resin film to enable scintillator panel 12 to achieve uniform contact with light-receiving element 13. For example, it is possible to employ a 125 μm thick flexible polyimide film. Other than the polyimide film, it is possible to employ cellulose acetate film, polyester film, polyethylene terephthalate film, polyethylene naphthalate film, polyamide film, triacetate film, or polycarbonate film. The thickness is preferably 50-500 μm.

Phosphor layer 121 is composed of a columnar crystal structured phosphor layer which results in light-guiding effects and exhibits high light emission efficiency. For example, via vacuum deposition employing a phosphor material as a source material incorporating cesium iodide (CsI) to which thallium (Tl) is added as an activator, it is possible to form the columnar crystal structured phosphor layer on substrate 122. Other than cesium iodide (CsI), it is also possible to employ cesium bromide (CsBr). As an activator, other than thallium (Tl), it is possible to employ europium, indium, lithium, potassium, rubidium, sodium, cupper, cerium, zinc, titanium, gadolinium, or terbium.

Cushioning layer 15 is employed so that scintillation panel 12 is brought into pressure contact with light-receiving element 13 at an appropriate pressure. Any appropriate material may be employed as long as it exhibits low X-ray absorption and a buffer action. For example, listed may be commercial products such as silicon or urethane based foaming materials, latex, polyethylene or rubber based sponge, or an air-bag which utilizes air pressure. Specifically, silicon or urethane based foaming materials are preferred since it is thereby possible to bring scintillator panel 12 into pressure contact with light-receiving element 13 at an appropriate pressure. The preferred pressure of the scintillator panel to the light-receiving element is found to be from 0.1 to 20 kPa.

Protection film 124 is employed to retard degradation of phosphor layer 121 by moistureproofing phosphor layer 121, and protection film 124 is composed of resins or film exhibiting low moisture permeability. For example, polyparaxylene film 124 is formed via a CVD (Chemical Vapor Deposition) method in the gap and on the surface of scintillator panel 12. Further, it is possible to employ polyethylene terephthalate (PET) film as the film. Other than PET film, employed may be polyester film, polymethacrylate film, nitrocellulose film, cellulose acetate film, polypropylene film, or polyethylene naphthalate film.

Figure 2:
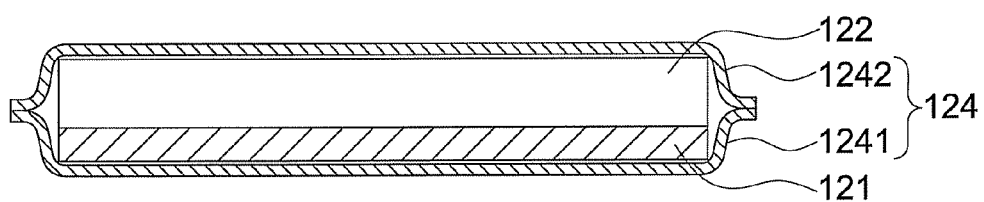
FIG. 2 is a configuration view when film is employed as a protective layer.

FIG. 2 is a configuration view in which film is employed as a protective layer. A fusion layer is formed on facing surfaces of first protection film 1241 and second protection film 1242 to form a seal by fusion to each other. For example, a casting polypropylene (CPP) layer is formed. Sealing may be effected by sandwiching substrate 122 and phosphor layer 121 via first protection film 1241 and second protection film 1242, followed by adhering with fusion the contacting edges of first protection film 1241 and second protection film 1242 under reduced pressure.

Light-receiving element 13 is composed of a plurality of light-receiving pixels which are arranged two-dimensionally. For example, it is possible to compose it employing photodiode+thin-film transistor (TFT). The signal charges which have been subjected to photoelectric conversion by the photodiodes are read out by the TFT. In addition, it is possible to employ CMOS or CCD as light-receiving element 13.

Protection cover 14 protects scintillator panel 12 against such as external impact, and also functions to compress cushioning layer 15 so that scintillator panel 12 is brought into pressure contact with light-receiving element 13 at an appropriate pressure. As protection cover 14, preferred are materials that allow high radiation transmission and exhibit low radiation scattering, and further are capable of physically resisting against impact to some extent. Specifically, listed may be carbon plates, aluminum plates or fiber reinforced plastics (FRP). As protection cover 14 of the present invention, the carbon plate or the aluminum plate is particularly preferred.

Although it is possible that cushioning layer 15 is not employed, however without cushioning layer 15, it is difficult to bring scintillator panel 12 into pressure contact with light-receiving element 13 at an appropriate pressure. As a result, close contact between scintillation panel 12 and light-receiving element 13 may be insufficient, whereby sharpness is degraded.

With regard to phosphor layer 121 according to the present invention, crystals are formed utilizing Cs as a base, and CsI is especially appropriate. It is preferable to incorporate activators into phosphor layer 121. It is acceptable that the content of the above activators is at least 0.01 mol % with respect to the CsI. In this case, when the content of the activators is less than 0.01 mol % with respect to the CsI, the emission luminance is practically the same as the emission luminance produced when CsI is used alone, whereby it is impossible to achieve targeted emission luminance. The content ratio of the activators specified as above refers to the ratio in the material itself during forming phosphor layer 121. In the present invention, since phosphor layer 121 is formed via vapor deposition, the materials for forming phosphor layer 121, as described herein, refer to the raw materials employed as a source of supply (source of vapor deposition) during vapor deposition.

The method for forming phosphor layer 121 on substrate 122 will now be described.

Phosphor layer 121 is formed via a vapor deposition method.

The vapor deposition method is one in which substrate 122 is placed in a conventional vapor deposition apparatus and at the same time raw materials for the phosphor layer containing activator, as specified as above, and gold or gold compounds are loaded in separate boats which are placed within the source of vapor deposition, and after that, while evacuating the interior of the apparatus, inert gas such as nitrogen is introduced via an inlet to realize vacuum of $1.33–1.33 \times 10^{-3}$ Pa, followed by evaporating by heating the boat, loaded with phosphor containing activators, by means of such as a resistance heating method, whereby the phosphor is vaporized and deposited onto substrate 122 until the desired thickness of phosphor layer 121 is formed on substrate 122. It is possible to carry out the vapor deposition process a plurality of times to form phosphor layer 121.

For example, a plurality of vapor deposition sources having the same composition may be prepared, and after completion of vapor deposition from one vapor deposition source, subsequent vapor deposition from another vapor deposition source starts and this is repeated until the desired thickness of phosphor layer 121 is realized. In addition, if needed, substrate 122 may be cooled or heated during vapor deposition. Further, after the vapor deposition is completed, phosphor layer 121 together with substrate 122 may be subjected to a heat treatment.

Vapor deposition apparatus 61 will now be described with reference to FIG. 3 as an example of vapor deposition apparatus employed when vapor deposition method is carried out.

Vapor deposition apparatus 61 is provided with vacuum pump 66 and vacuum enclosure 62 which results in vacuum by operation of vacuum pump 66. Resistance heating crucible 63 is arranged as a source of vapor deposition in the interior of vacuum enclosure 62, and above resistance heating crucible 63, substrate 122, which is constructed to be rotatable via rotation mechanism 65 is mounted on substrate holder 64.

Further, between resistance heating crucible 63 and substrate 122, a slit is provided to regulate, if needed, the phosphor vapor stream, which is evaporated from resistance heating crucible 63. In addition, substrate 122 is employed while mounted onto substrate holder 64 during use of vapor deposition apparatus 61.

EXAMPLES

The present invention will now be specifically described with reference to examples. However the embodiments of the present invention are not limited thereto.

Example 1

(Preparation of Radiation Transmitting Substrate)

Radiation transmitting substrates (hereinafter referred to as substrates) 1-4 described below (also described in columns of substrate types in Tables 1 and 2) were prepared, and regarding substrates 1, 2 and 4, each reflective layer was formed on the vapor deposition surface by sputtering of aluminum. Sizes of the substrates included three types, being 13 cm×13 cm, 20 cm×25 cm, and 30 cm×40 cm, respectively.

1: a 125 μm thick polyimide film
2: a 500 μm thick amorphous carbon plate
3: a 500 μm thick aluminum plate
4: a 1000 μm thick amorphous carbon plate (Preparation of Sublayers)

| | |
|---|---|
| VYLON 20SS (polymer polyester resin produced by Toyobo Co., Ltd.) | 300 parts by weight |
| Methyl ethyl ketone (MEK) | 200 parts by weight |
| Toluene | 300 parts by weight |
| Cyclohexanone | 150 parts by weight |

The above components were blended and the resulting mixture was dispersed over 15 hours, employing a bead mill, whereby a liquid coating composition for sublayer coating was prepared. After applying the above liquid coating composition onto the vapor deposition surface of each of the above substrates 1-4, to a dried layer thickness of 1.0 μm, employing spin coating, drying was conducted at 100° C. for 8 hours, whereby sublayers were prepared.

(Formation of Scintillator Layer)

Figure 3:
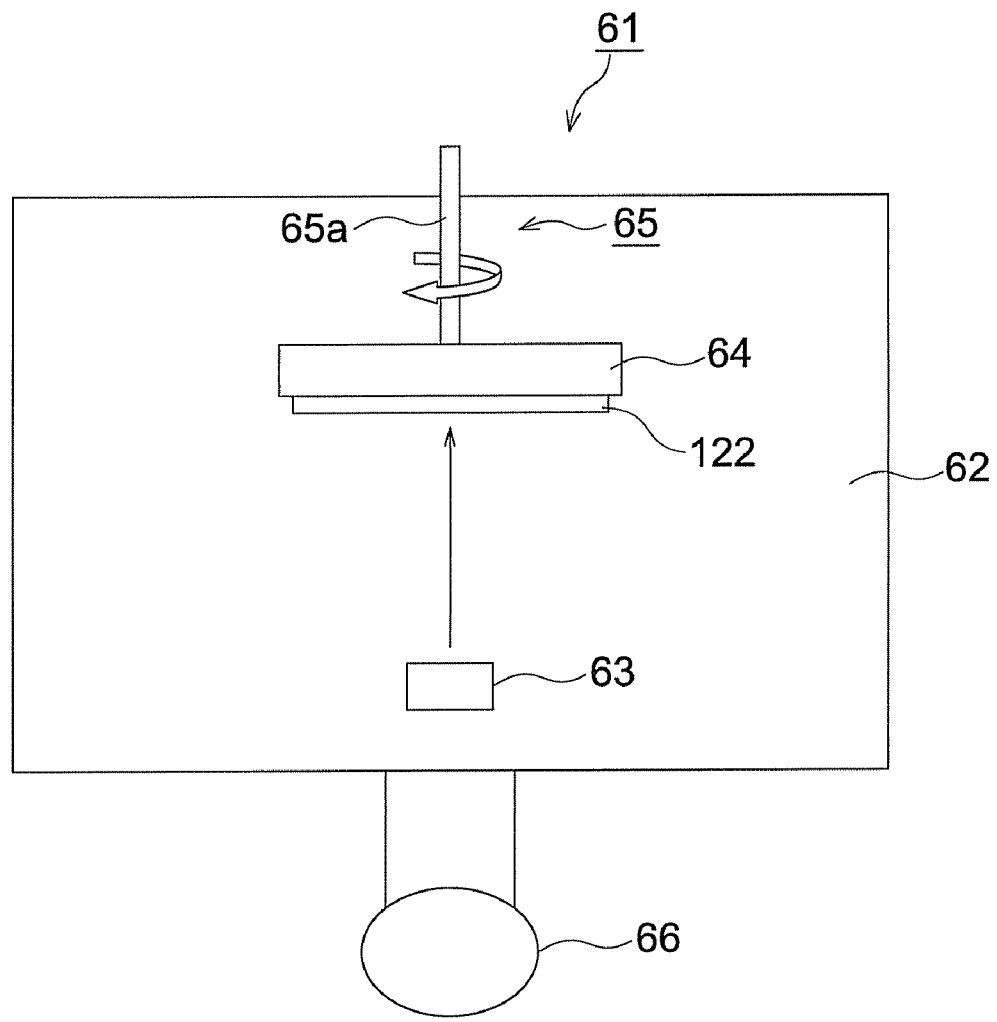
FIG. 3 is a schematic configuration view of a vapor deposition apparatus.

A phosphor layer was formed on the entire surface of the substrate via vapor deposition of scintillator phosphor (CsI: 0.03 Tl mol %) on the sublayer side of the substrate by employing the vapor deposition apparatus shown in FIG. 3.

Initially, the above raw phosphor materials, serving as vapor deposition materials, were loaded in a resistance heating crucible, the substrate was mounted on the rotatable substrate holder and the distance between the substrate and the vapor deposition source was regulated to 400 mm.

Subsequently, after the degree of the vacuum of the interior of the vapor deposition apparatus was regulated to 0.5 Pa by once exhausting ambient airs and then introducing Ar gas, the temperature of the substrate was maintained at 200° C. while rotating the substrate at a rate of 10 rpm. Subsequently, phosphors were vapor-deposited onto the substrate by heating the resistance heating crucible, and then the phosphor layer was formed on the substrate by terminating the vapor deposition when the thickness of each of the phosphor layers reached the numerical values shown in Tables 1 and 2.

(Formation of Protective Layer (or Called as "Protection Film"))

A scintillator panel was prepared in such a manner that a substrate on which a phosphor layer was formed was placed in the vapor deposition chamber of a CDV apparatus and the substrate was exposed to the vapor of sublimated raw polyparaxylene materials to cover the total surface of the substrate, on which the phosphor layer was formed as a 20 μm thick polyparaxylene film.

(Evaluation)

The resulting scintillator panel was placed in PAXSCAN (FPD: 1313, 2520, and 4030, produced by Varian Medical Systems, Inc.) and sharpness when the radiation incident side of the FPD was directed upward, and sharpness of the central part of the scintillator panel when its radiation incident side was directed downward, were evaluated by the method described below. Tables 1 and 2 show the results.

The pressure of pressure contact of the flat light-receiving element with the scintillator panel was regulated by changing the thickness of a urethane based foaming sheet which was arranged on a carbon plate of a radiation incident window and on the radiation incident side of the scintillator panel (the side having no phosphors).

(Evaluation Method of Sharpness)

X-rays, of a tube voltage of 80 kVp, were exposed onto the radiation incident side of the FPD through a MTF chart composed of lead, and image data were detected and recorded on a hard-disk. After that, the data on the hard-disk were analyzed via a computer, and a modulation transfer function, MTF (MTF value at a spatial frequency of 1 cycle/mm) of the X-ray images recorded on the above hard-disk was regarded as an index of sharpness. In Tables, the higher the MTF value the more enhanced the sharpness. MTF represents Modulation Transfer Function.

The above evaluation results are shown in Table 1.

TABLE 1

| Contact Pressure (kPa) | Substrate Type | Thickness of Phosphor Layer (μm) | Weight of Scintillator Panel per 1.0 cm$^2$ (g) | Radiation Incident Plane Direction of the FPD | Size of Substrate (cm)/area S (cm$^2$) | | | Remarks |
|---|---|---|---|---|---|---|---|---|
| | | | | | 13 × 13 169 cm$^2$ | 25 × 20 500 cm$^2$ | 40 × 30 1200 cm$^2$ | |
| | | | | | MTF | | | |
| 5 | 1 | 600 | 0.27 | upward | 0.51 | 0.51 | 0.51 | Inv. |
| | | | | downward | 0.51 | 0.51 | 0.51 | |
| | | 500 | 0.23 | upward | 0.55 | 0.55 | 0.55 | Inv. |
| | | | | downward | 0.55 | 0.55 | 0.55 | |
| | | 400 | 0.19 | upward | 0.59 | 0.59 | 0.59 | Inv. |
| | | | | downward | 0.59 | 0.59 | 0.59 | |
| | | 300 | 0.15 | upward | 0.63 | 0.63 | 0.63 | Inv. |
| | | | | downward | 0.63 | 0.63 | 0.63 | |
| | 2 | 600 | 0.34 | upward | 0.49 | 0.49 | 0.49 | Comp. |
| | | | | downward | 0.49 | 0.44 | 0.40 | |
| | | 500 | 0.30 | upward | 0.53 | 0.53 | 0.53 | Inv. |
| | | | | downward | 0.53 | 0.53 | 0.53 | |
| | | 400 | 0.26 | upward | 0.57 | 0.57 | 0.57 | Inv. |
| | | | | downward | 0.57 | 0.57 | 0.57 | |
| | | 300 | 0.22 | upward | 0.61 | 0.61 | 0.61 | Inv. |
| | | | | downward | 0.61 | 0.61 | 0.61 | |
| | 3 | 600 | 0.39 | upward | 0.47 | 0.47 | 0.47 | Comp. |
| | | | | downward | 0.46 | 0.41 | 0.37 | |
| | | 500 | 0.35 | upward | 0.51 | 0.51 | 0.51 | Comp. |
| | | | | downward | 0.51 | 0.46 | 0.41 | |
| | | 400 | 0.31 | upward | 0.55 | 0.55 | 0.55 | Inv. |
| | | | | downward | 0.55 | 0.55 | 0.55 | |
| | | 300 | 0.27 | upward | 0.59 | 0.59 | 0.59 | Inv. |
| | | | | downward | 0.59 | 0.59 | 0.59 | |
| | 4 | 600 | 0.43 | upward | 0.45 | 0.45 | 0.45 | Comp. |
| | | | | downward | 0.43 | 0.38 | 0.35 | |
| | | 500 | 0.39 | upward | 0.49 | 0.49 | 0.49 | Comp. |
| | | | | downward | 0.48 | 0.43 | 0.39 | |
| | | 400 | 0.34 | upward | 0.53 | 0.53 | 0.53 | Comp. |
| | | | | downward | 0.53 | 0.48 | 0.43 | |
| | | 300 | 0.30 | upward | 0.57 | 0.57 | 0.57 | Inv. |
| | | | | downward | 0.57 | 0.57 | 0.57 | |

Inv.: Present Invention,
Comp.: Comparative Example

TABLE 2

| Size of Substrate (cm) | Substrate Type | Thickness of Phosphor Layer (μm) | Weight of Scintillator Panel per 1.0 cm² (g) | Radiation Incident Plane Direction of the FPD | Contact Pressure (kPa) 0.50 | 1.00 | 20.00 | 30.00 | Remarks |
|---|---|---|---|---|---|---|---|---|---|
| 25 × 20 | 1 | 600 | 0.27 | upward | 0.51 | 0.51 | 0.51 | 0.48 | Present |
|  |  |  |  | downward | 0.48 | 0.51 | 0.51 | 0.48 | Invention |
|  | 4 | 600 | 0.43 | upward | 0.45 | 0.45 | 0.45 | 0.41 | Comparative |
|  |  |  |  | downward | 0.35 | 0.36 | 0.39 | 0.41 | Example |

As can clearly be seen from the results shown in Tables 1 and 2, Examples according to the present invention exhibited sharpness which was superior to the Comparative Examples.

What is claimed is:

1. A radiation image detector comprising:
   a scintillator panel comprising a radiation transmitting substrate having thereon a phosphor layer having a columnar crystal structure of CsI produced with a vapor deposition method;
   a protection cover provided at a side of the radiation transmitting substrate opposite the phosphor layer, provided that incident radiation enters through the protection cover; and
   a flat light-receiving element provided at a side of the radiation transmitting substrate opposite the protection cover, the flat light-receiving element comprising a plurality of light-receiving pixels arranged in a two-dimensional form and capable of converting light emitted from the scintillator panel to electricity, the flat light-receiving element being arranged to allow pressure contact with the scintillator panel;
   wherein the radiation image detector satisfies the following Formula (1):

$$W(g) < 0.31(g/cm^2) \times S(cm^2) \quad \text{Formula (1)}$$

wherein $S(cm^2)$ is an area of the radiation transmitting substrate of the scintillator panel and $W(g)$ is a weight of the scintillator panel; and
   the phosphor layer has a thickness of 400 to 1,000 μm, and the area of the radiation transmitting substrate is 500 to 5,000 cm²; and
   the radiation transmitting substrate has a thickness of 50-500 μm and is made of a flexible resin film selected from the group consisting of a polyimide film, a cellulose acetate film, a polyester film, a polyethylene terephthalate film, a polyethylene naphthalate film, a polyamide film, a triacetate film, and a polycarbonate film.

2. The radiation image detector of claim 1,
   wherein a foaming material is provided in a space between the protection cover and the scintillator panel so as to bring the scintillator panel into pressure contact with the flat light-receiving element at a pressure of 0.1 to 20 kPa.

3. The radiation image detector of claim 2,
   wherein the foaming material is a silicon foaming material or a urethane foaming material.

4. The radiation image detector of claim 1,
   wherein the protection cover comprises aluminum or carbon.

* * * * *